US008633677B2

(12) United States Patent
Kim

(10) Patent No.: US 8,633,677 B2
(45) Date of Patent: Jan. 21, 2014

(54) BATTERY PACK AND METHOD OF CHARGING BATTERY PACK

(75) Inventor: Youn-Gu Kim, Yongin-si (KR)

(73) Assignee: Samsung SDI Co., Ltd., Yongin-Si, Gyeonggi-Do (KR)

(*) Notice: Subject to any disclaimer, the term of this patent is extended or adjusted under 35 U.S.C. 154(b) by 386 days.

(21) Appl. No.: 12/979,190

(22) Filed: Dec. 27, 2010

(65) Prior Publication Data

US 2011/0156655 A1 Jun. 30, 2011

(30) Foreign Application Priority Data

Dec. 28, 2009 (KR) .................. 10-2009-0131800

(51) Int. Cl.
*H02J 7/00* (2006.01)

(52) U.S. Cl.
USPC ........... 320/134; 320/139; 320/140; 320/152; 320/162

(58) Field of Classification Search
USPC .......................................................... 320/134
See application file for complete search history.

(56) References Cited

U.S. PATENT DOCUMENTS

| | | | |
|---|---|---|---|
| 5,889,382 | A | 3/1999 | Jung |
| 7,012,405 | B2 | 3/2006 | Nishida et al. |
| 7,432,685 | B2 | 10/2008 | Hayashi |
| 7,737,658 | B2 | 6/2010 | Sennami et al. |
| 2005/0156574 | A1 | 7/2005 | Sato et al. |
| 2005/0162131 | A1 | 7/2005 | Sennami et al. |
| 2009/0121684 | A1* | 5/2009 | Hussain et al. ............... 320/139 |

FOREIGN PATENT DOCUMENTS

| | | |
|---|---|---|
| JP | 06-105476 A | 4/1994 |
| JP | 11-185824 A | 7/1999 |
| JP | 2003-087990 A | 2/2003 |
| JP | 2004-260909 A | 9/2004 |
| JP | 2005-130663 A | 5/2005 |
| JP | 2005-135601 A | 5/2005 |
| JP | 2007-060772 A | 3/2007 |
| JP | 2009-106145 A | 5/2009 |
| KR | 100181164 B1 | 12/1998 |
| KR | 1999-0090995 U | 7/1999 |
| KR | 10-2005-0040737 A | 5/2005 |
| KR | 100530691 B1 | 11/2005 |
| KR | 2008-0028170 A | 3/2008 |

OTHER PUBLICATIONS

Korean Registration Determination Certificate dated Nov. 30, 2011 for Korean Patent Application No. KR 10-2009-0131800 which corresponds to captioned U.S. Appl. No. 12/979,190.
Korean Office Action dated Apr. 7, 2011 for Korean Patent Application No. KR 10-2009-0131800 which corresponds to captioned U.S. Appl. No. 12/979,190.
Japanese Office Action dated Aug. 7, 2012 for Japanese Patent Application No. JP 2010-195567 which shares priority of Korean Patent Application No. KR 10-2009-0131800 with captioned U.S. Appl. No. 12/979,190.

* cited by examiner

*Primary Examiner* — Edward Tso
*Assistant Examiner* — Johali Torres Ruiz
(74) *Attorney, Agent, or Firm* — Knobbe, Martens, Olson and Bear, LLP

(57) ABSTRACT

A battery pack and a method of charging the same are disclosed. The battery pack is chargeable by a variety of chargers which have different output voltages.

18 Claims, 6 Drawing Sheets

BATTERY PACK AND METHOD OF CHARGING BATTERY PACK

CROSS-REFERENCE TO RELATED APPLICATIONS

This application claims the benefit of Korean Patent Application No. 10-2009-0131800, filed on Dec. 28, 2009, in the Korean Intellectual Property Office, the disclosure of which is incorporated herein in its entirety by reference.

BACKGROUND

1. Field

The disclosed technology relates to a battery pack and a method of charging the battery pack.

2. Description of the Related Technology

There has been ever increasing use of portable electronic devices, such as mobile phones, digital cameras, notebook computers, and the like, and thus research into batteries for supplying power to portable electronic devices has been actively conducted.

A battery may take the form of a battery pack which has a battery cell and a protection circuit for controlling charging and discharging of the battery cell, and may be lithium ion batteries, nickel-cadmium (Ni—Cd) batteries, and the like.

In this regard, discharging voltage and charging voltage vary according to the type of battery cells. In addition, charging voltage may vary according to the configuration of bare cells in the battery cells even if the type of battery cells is the same. Battery cells are charged with a rated voltage, or otherwise battery cells may be damaged. Thus, when battery cells are charged, chargers use voltages which correspond to the type of battery cells used.

SUMMARY OF CERTAIN INVENTIVE ASPECTS

Aspects include a battery pack that is chargeable by any of a variety of types of chargers and a method of charging the battery pack.

One aspect is a battery pack including a chargeable battery cell, a charging terminal part selectively connectable to the battery cell, a protection circuit configured to control charging and discharging of the battery cell, and a first switching element connected between the battery cell and the charging terminal part. The battery pack also includes a converter circuit connected to the charging terminal part, the converter circuit configured to receive an input voltage applied to the charging terminal part and to output a voltage different from the input voltage, and a second switching element connected between the converter circuit and the battery cell.

Another aspect is a method of charging a battery pack including a battery cell and a charging control circuit for controlling charging of the battery cell. The method includes determining that a charger is connected to the battery pack, determining a first voltage applied by the charger, determining a voltage for charging the battery cell, and charging the battery cell with one of the first voltage and a voltage based on the first voltage according to the voltage for charging the battery cell.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF CERTAIN INVENTIVE EMBODIMENTS

Figure 1:
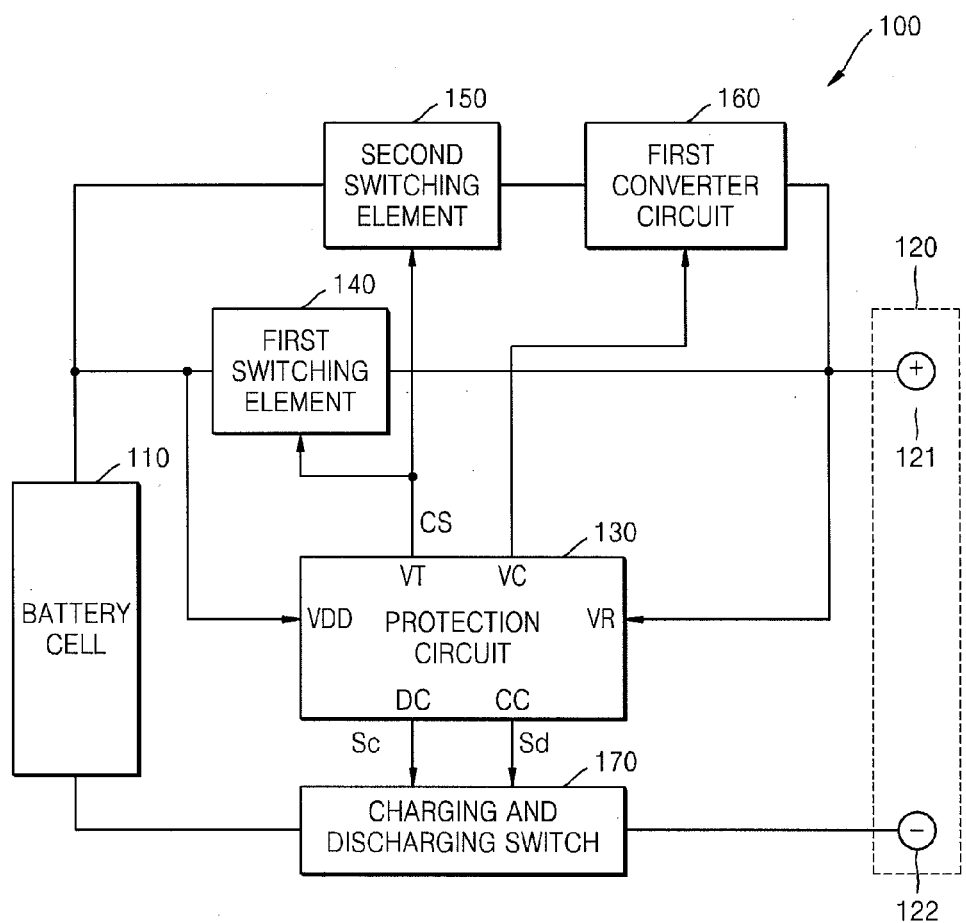
FIG. 1 is a block diagram illustrating a battery pack according to an embodiment.

Reference will now be made to embodiments, examples of which are illustrated in the accompanying drawings, wherein like reference numerals generally refer to like elements throughout. Embodiments may have different forms and should not be construed as being limited to the descriptions set forth herein. Accordingly, the embodiments are described below, with reference to the figures, to explain various inventive aspects.

FIG. 1 is a block diagram illustrating a battery pack 100 according to an embodiment.

The battery pack 100 includes a battery cell 110, a charging terminal part 120, a protection circuit 130, a first switching element 140, a second switching element 150, a first converter circuit 160, and a charging and discharging switch 170.

The battery cell 110 may include at least one bare cell. If the battery cell 110 is connected to an external device through the charging terminal part 120, the battery cell 110 may be charged or discharged. The bare cell includes an electrode assembly including a positive electrode plate, a negative electrode plate, a separator, a can accommodating the electrode assembly therein and having a top opening, and a cap assembly covering the top opening of the can to seal the can. The battery cell 110 may be a rechargeable secondary battery. The battery cell 110 may have various output voltages. The voltages that may be output by the battery cell 110 include a common voltage and a high voltage. In some embodiments, the common voltage may be about 4.2 V, and the high voltage may be in the range of about 4.35 V to about 4.4 V.

To charge the battery 110, the charging terminal part 120 may be connected to an external charger. The charging terminal part 120 includes a positive electrode terminal 121 and a negative electrode terminal 122. The charging terminal part 120 is connected in parallel to the battery cell 110, and may be connected to an external charger to charge the battery cell 110. If the charging terminal part 120 is connected to an external electronic device, the battery cell 100 is discharged via the charging terminal part 120.

A path between the charging terminal part 120 and the battery cell 110 may be a large current path used for charging and discharging the battery cell 110. A large current may flow via the large current path.

The protection circuit 130 controls internal operations of the battery pack 100 to allow the battery cell 110 to stably operate. In particular, the protection circuit 130 controls the first switching element 140, the second switching element 150, and the charging and discharging switch 170 to control the charging and discharging of the battery cell 110. The protection circuit 130 detects the voltage output by the battery cell 110 via a VDD terminal, and if the protection circuit 130 determines that the battery cell 110 is overcharged or over-discharged, a charging control signal Sc or a discharging control signal Sd is applied to the charging and discharging switch 170. The charging control signal Sc and the discharging control signal Sd may control a transistor included in the charging and discharging switch 170 to selectively interrupt current flow.

In addition, the protection circuit 130 determines an input voltage applied to the charging terminal part 120 and the voltage for charging the battery cell 110. The input voltage applied to the charging terminal part 120 may, for example, be an output voltage of a charger. As a result of the determination, the protection circuit 130 outputs a switching control signal Cs via a VT terminal. The switching control signal CS controls any one of the first switching element 140 and the second switching element 150 to be in an on-state. The input voltage applied to the charging terminal part 120 and the voltage for charging the battery cell 110 may be determined based on a voltage applied to a VR terminal.

The first switching element 140 is connected between the battery cell 110 and the charging terminal part 120 on the large current path to form a charging or discharging path. The first switching element 140 is controlled to be in one of on and off states by the switching control signal CS generated by the protection circuit 130. When the first switching element 140 is in the on-state, a charging voltage from the charger connected to the charging terminal part 120 is applied to the battery cell 110.

The second switching element 150 is connected between the battery cell 110 and the first converter circuit 160 on a current path to form a charging or discharging path. The second switching element 150 is controlled to be in one of on and off states by the switching control signal CS generated by the protection circuit 130. When the second switching element 150 is in an on-state, an output voltage of the first converter circuit 160 is applied to the battery cell 110.

The first converter circuit 160 increases or decreases the voltage applied to the charging terminal part 120 according to a control signal generated by the protection circuit 130, and outputs the voltage to the second switching element 150. For this function, the first converter circuit 160 may include a voltage increasing circuit for increasing the voltage applied thereto, and a voltage decreasing circuit for decreasing the voltage applied thereto. The voltage applied to the first converter circuit 160 is the output voltage of the charger. The output voltage of the charger corresponds to the voltage for charging the battery cell to be charged by the charger. Thus, the voltage applied to the first converter circuit 160 may be about 4.2 V, and may also be in the range of about 4.3 V to about 4.5 V.

The charging and discharging switch 170 controls the charging and discharging of the battery cell 110 according to the charging and discharging control signals Sc and Sd applied from the protection circuit 130.

Hereinafter, a circuit of the battery pack illustrated in FIG. 1 will be described in more detail.

Figure 2:
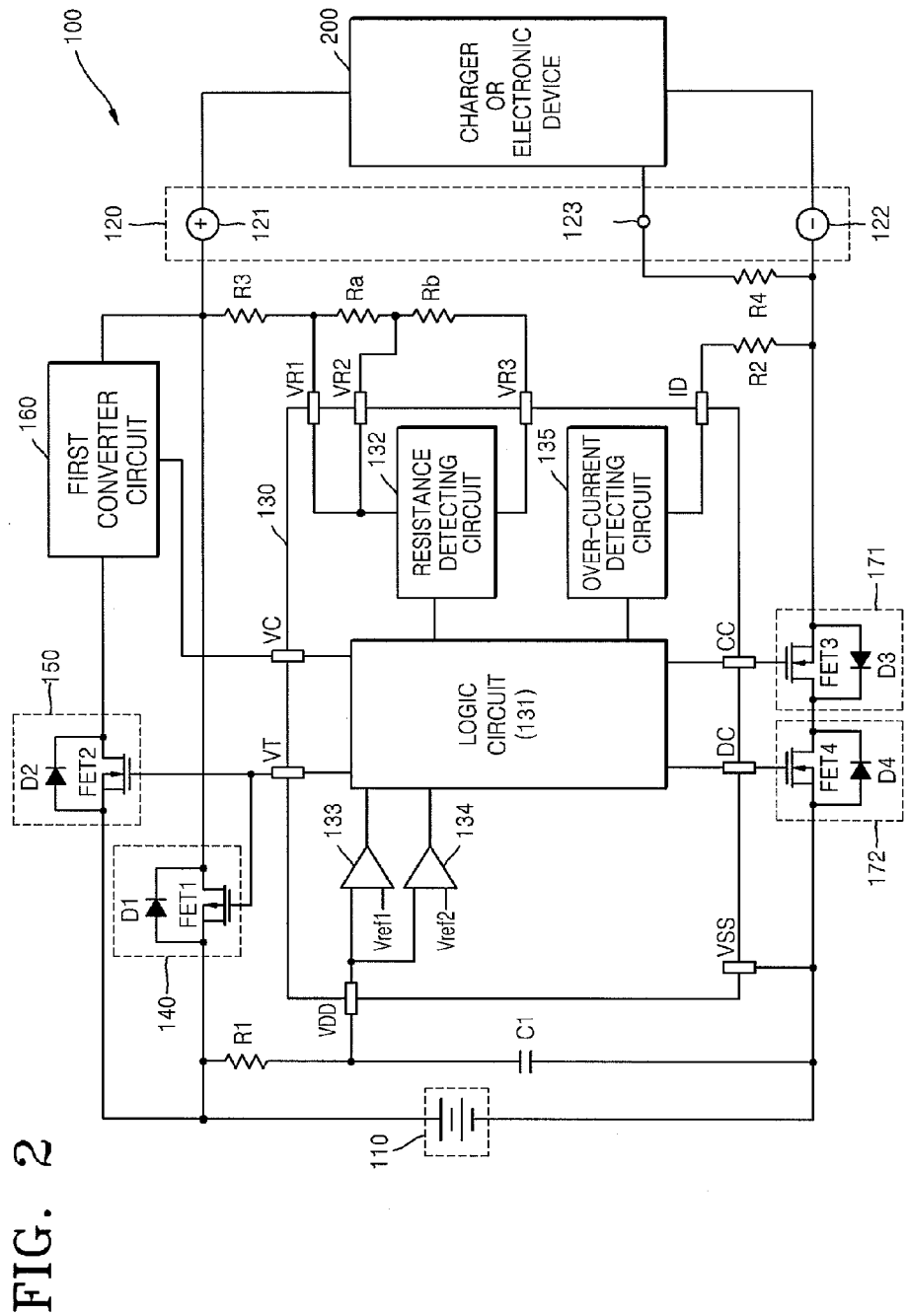
FIG. 2 is a circuit diagram of the battery pack of FIG. 1.

FIG. 2 is a circuit diagram of the battery pack of FIG. 1.

The charging terminal part 120 includes the positive electrode terminal 121 and the negative electrode terminal 122. When the positive electrode terminal 121 and the negative electrode terminal 122 are connected to an electronic device, the battery cell 110 is discharged. On the other hand, when the positive electrode terminal 121 and the negative electrode terminal 122 are connected to a charger, the battery cell 110 is charged. In this regard, the negative electrode terminal 122 may be connected to a capacitance detecting resistor R4 that represents the capacitance of the battery cell 110. One terminal 123 of the capacitance detecting resistor R4 is connected to an external device, and the external device detects a resistance value of the capacitance detecting resistor R4 to determine the capacitance of the battery cell 110.

The protection circuit 130 includes a logic circuit 131, a resistance detecting circuit 132, a plurality of overcharging detecting parts 133 and 134, an over-current detecting circuit 135, a plurality of input terminals, and a plurality of output terminals. The protection circuit 130 may include VSS, VDD, ID, VR1, VR2 and VR3 terminals as input terminals, and includes VT, VC, DC and CC terminals as output terminals.

The logic circuit 131 controls the operation of the protection circuit 130, and generally controls the charging and discharging of the battery cell 110. The logic circuit 131 generates the switching control signal CS, the charging control signal Sc, the discharging control signal Sd, and a voltage increasing control signal according to the output voltage of the charger, the voltage for charging the battery cell 100, charging and discharging states of the battery cell 110, and internal current flow state of the battery pack 100. The switching control signal CS, the charging control signal Sc, the discharging control signal Sd, and the voltage increasing control signal are respectively output via the VT terminal, the DC terminal, the CC terminal, and the VC terminal, respectively. In addition, the voltage for charging the battery cell 110 may be previously stored in the logic circuit 131.

To determine the voltage for charging the battery cell 110, the protection circuit 130 may include the resistance detecting circuit 132. The resistance detecting circuit 132 recognizes a resistor Ra connected between the VR1 terminal and the VR2 terminal of the protection circuit 130 and a resistor Rb connected between the VR2 terminal and the VR3 terminal of the protection circuit 130. Once the charging terminal part 120 is connected to the charger, a voltage is applied to the resistors Ra and Rb, and the resistance detecting circuit 132 may detect the voltage for charging the battery cell 110 and the output voltage of the charger from voltage values corresponding to resistance values of the resistors Ra and Rb. The resistance values of the resistors Ra and Rb may vary according to the voltage for charging the battery cell 110. A method of determining the voltage for charging the battery cell 110 and the output voltage of the charger will now be described.

For example, the voltage for charging the battery cell 110 may be determined by using a ratio of the resistance value of the resistor Ra to the resistance value of the resistor Rb. In other words, if, for example, Ra:Rb=2:1, the voltage for charging the battery cell 110 may be a common voltage, on the other hand, if Ra:Rb=1:2, the voltage for charging the battery cell 110 may be a high voltage. In addition, the output voltage of the charger may be determined in such a way that the total values of the resistance values of the resistors Ra and Rb remain constant.

In particular, if, for example, R3=30 kΩ, Ra=20 kΩ, Rb=10 kΩ, and the output voltage of the charger is 4.2 V, 1.4 V is imposed between the VR1 terminal and the VR2 terminal, and 0.7 V is imposed between the VR2 terminal and the VR3 terminal. The resistance detecting circuit 132 detects the voltages of 1.4 V and 0.7 V to determine that the voltage for charging the battery cell 110 is a common voltage. In addition, 2.1 V is imposed between the VR1 terminal and the VR3 terminal, and the resistance detecting circuit 132 detects the voltage of 2.1 V to determine that the output voltage of the charger is 4.2 V.

If R3=30 kΩ, Ra=10 kΩ, Rb=20 kΩ, and the output voltage of the charger is 4.35 V, 0.725 V is imposed between the VR1 terminal and the VR2 terminal, and 1.45 V is imposed between the VR2 terminal and the VR3 terminal. The resistance detecting circuit 132 detects the voltages of 0.725 V and 1.45 V to determine that the voltage for charging the battery cell 110 is a high voltage. In addition, 2.175 V is imposed between the VR1 terminal and the VR3 terminal, and the resistance detecting circuit 132 detects the voltage of 2.175 V to determine that the output voltage of the charger is 4.35 V.

However, the determination method of the voltage for charging the battery cell 110 and the output voltage of the charger is not limited thereto.

The plurality of overcharging detecting parts 133 and 134 compare a voltage applied to the VDD terminal with reference voltages Vref1 and Vref2 to detect whether the battery cell 110 is overcharged. The VDD terminal is connected to a terminal between a capacitor C1 and a resistor R1 connected in series between positive and negative electrodes of the battery cell 110.

The over-current detecting circuit 135 measures a current supplied to the ID terminal to detect whether there is an over-current flowing inside the battery pack 100. A resistor R2 may be connected between the ID terminal and the negative electrode terminal 122.

The protection circuit 130 has a ground terminal that connects the VSS terminal with the negative electrode of the battery cell 110.

The first switching element 140 includes a filed effect transistor (FET) and a parasitic diode (D), and the second switching element 150 includes a FET and a D. In other words, the first switching element 140 includes a FET1 and a D1, and the second switching element 150 includes a FET2 and a D2. When the battery cell 110 is charged, the first switching element 140 and the second switching element 150 are selectively in on-states. Thus, to simultaneously control the first switching element 140 and the second switching element 150 using substantially the same control signal, a channel type of the FET1 may be different from a channel type of the FET2. For example, the FET1 may be an n-channel FET, and the FET2 may be a p-channel FET, or vice versa. Both the first switching element 140 and the second switching element 150 form a path for charging. Thus, source electrodes of the FET1 and the FET2 are connected to the positive electrode of the battery cell 110. Accordingly, when the battery cell 110 is charged, a charging current may be prevented from being supplied to the battery cell 110 simultaneously via the first switching element 140 and the second switching element 150. The FET1 of the first switching element 140 and the FET2 of the second switching element 150 are switching devices, and may be any of other kinds of electric devices that may act as a switching device.

The charging and discharging switch 170 may include a charging control switch 171 and a discharging control switch 172. The charging control switch 171 includes a FET3 and a D3, and the discharging control switch 172 includes a FET4 and a D4. A connection direction between a source and a drain of the FET3 of the charging control switch 171 are set opposite to those of the transistor FET4 of the discharging control switch 172. In this embodiment, the FET3 of the charging control switch 171 is connected so as to restrict a current flowing from the charging terminal part 120 towards the battery cell 110, while the FET4 of the discharging control switch 172 is connected so as to restrict a current flowing from the battery cell 110 towards the charging terminal part 120. The FET3 of the charging control switch 171 and the FET4 of the discharging control switch 172 are switching devices, and may be any of other kinds of electric devices that may act as a switching device. In addition, the D3 of the charging control switch 171 and the D4 of the discharging control switch 172 are connected in opposite directions in which current is restricted by FETs thereof.

A method of charging the battery pack 100 will now be described.

Figure 3:
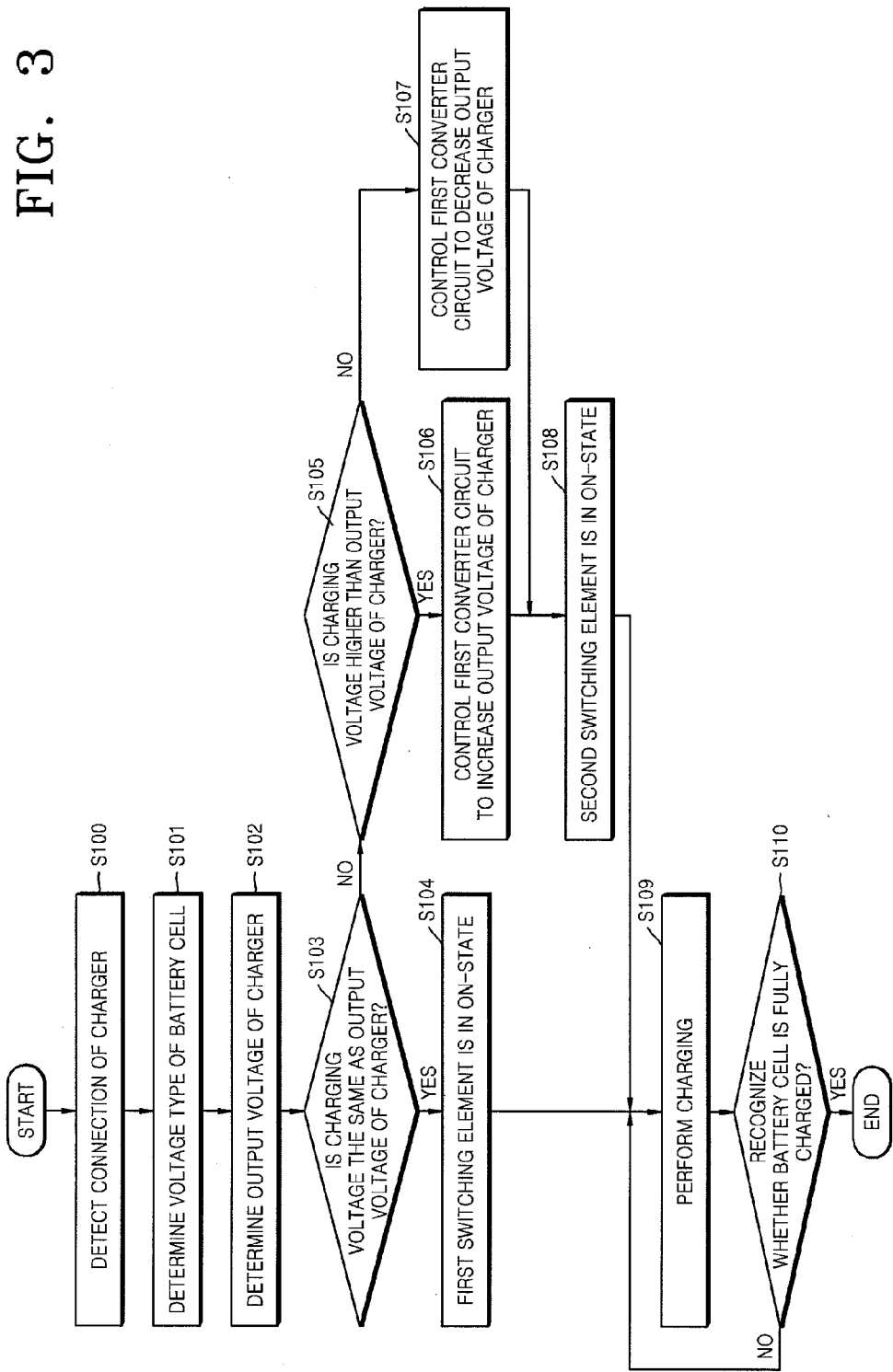
FIG. 3 is a flowchart illustrating a method of charging a battery pack, according to an embodiment.

FIG. 3 is a flowchart illustrating a method of charging a battery pack, according to an embodiment.

Referring to FIGS. 2 and 3, once the charging terminal part 120 is connected to the charger, the battery cell 110 recognizes that the charger is connected to the charging terminal part 120 (operation S100).

The charger detects an internal resistance value of the battery pack 100 to determine the capacitance of the battery cell 110. Once connected to the charger, the battery pack 100 determines the voltage for charging the battery cell 110 and the output voltage of the charger by using the resistance detecting circuit 132 (operations S101 and S102). For example, the battery pack 100 may determine whether the voltage for charging the battery cell 110 is a high voltage or a common voltage. In addition, the battery pack 100 may determine whether the charger is a charger for a common voltage type battery cell or a charger for a high voltage type battery cell. The common voltage may indicate that the output of the battery cell 110 is about 4.2 V, and the high voltage may indicate that the output of the battery cell is in the range of about 4.35 V to about 4.4 V. The voltage for charging the battery, cell 110 may be determined by using resistance values of the resistors connected to the protection circuit 130, but is not limited thereto. For example, the voltage for charging the battery cell 110 may be determined by previously storing the voltage for charging the battery cell 110 in the logic circuit 131, when the battery pack 100 is manufactured.

After the voltage for charging the battery cell 110 and the output voltage of the charger are determined, it is determined whether the output voltage of the charger is substantially the same as a charging voltage (operation S103), and if different, whether the charging voltage is greater than the output voltage of the charger (operation S105). The charging voltage is used to charge the battery cell 110, and its value depends on the voltage for charging the battery cell 110.

If the output voltage of the charger is substantially the same as the charging voltage, the logic circuit 131 applies the low-level switching control signal CS to the first switching element 140 to switch on the FET1 (operation S104). In addition, the logic circuit 131 applies the high-level charging control signal Sc to the charging control switch 171 to switch on the FET3. As a result, a large current path through the positive electrode terminal 121, the FET1, the battery cell 110, the D4, the FET3, and the negative electrode terminal 122 is formed.

If the charging voltage is greater than the output voltage of the charger, the logic circuit 131 controls the first converter circuit 160 to increase the output voltage of the charger and output a voltage that is substantially the same as the charging voltage (operation S106). On the other hand, if the charging voltage is lower than the output voltage of the charger, the logic circuit 131 controls the first converter circuit 160 to decrease the output voltage of the charger and to output a voltage that is substantially the same as the charging voltage (operation S107). The logic circuit 131 applies the low-level switching control signal CS to the second switching element 150 to switch on the FET2. As a result, a current path through the positive electrode terminal 121, the first converter circuit 160, the FET2, the battery cell 110, the D4, the FET3, and the negative electrode terminal 122 is formed.

The battery cell 110 is charged via the current path (operation S109). It is determined whether the battery cell 110 is fully charged (operation S110). If the battery cell 110 is fully charged, the charging of the battery cell 110 is terminated, and if not, the operation goes back to the operation S109 to continue the charging of the battery cell 110.

As described above, the battery pack 100 determines the voltage for charging the battery cell 110 and the output voltage of the charger, and changes or uses the output voltage of the charger as a result of the determination. Thus, optimal charging of the battery cell 110 may be performed.

Figure 4:
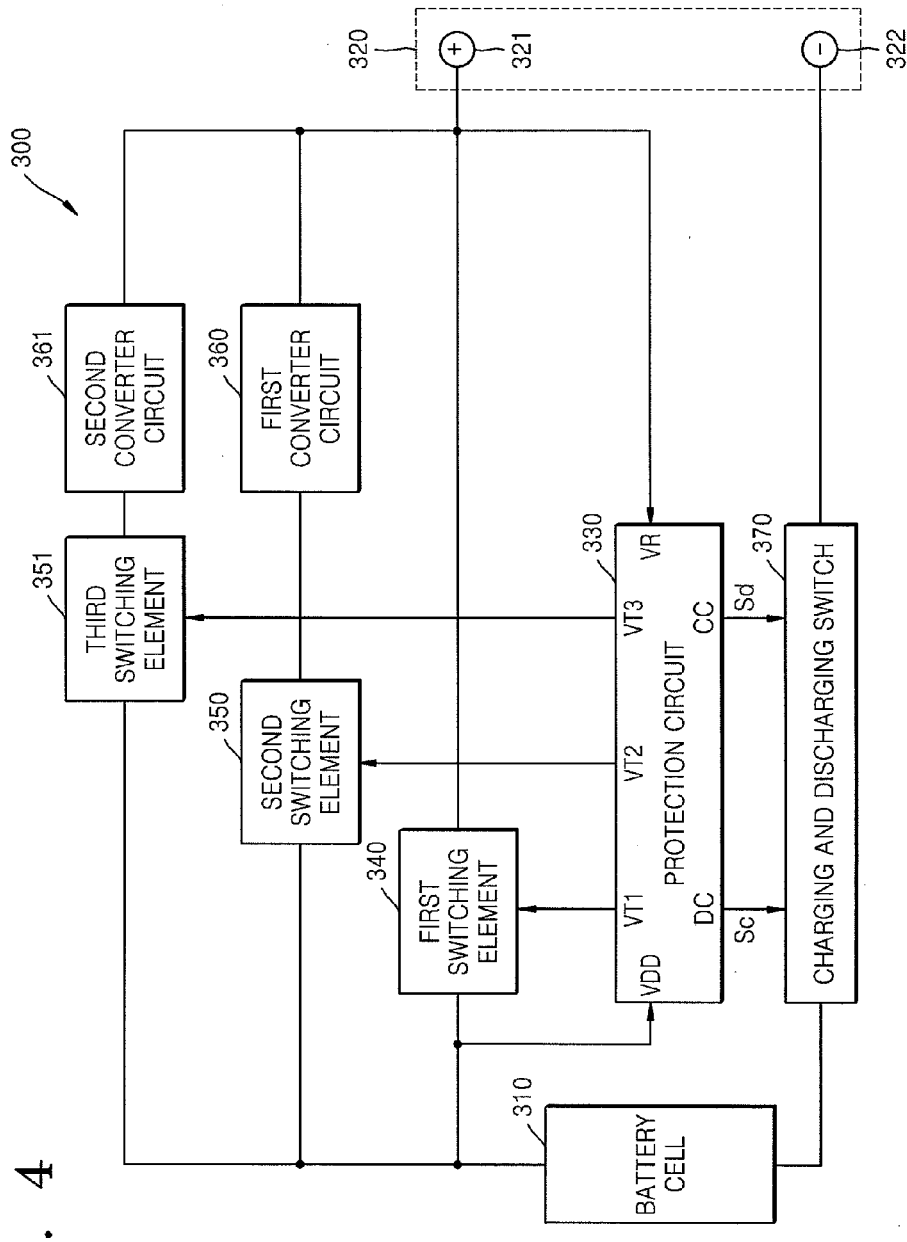
FIG. 4 is a block diagram illustrating a battery pack according to another embodiment.
Figure 5:
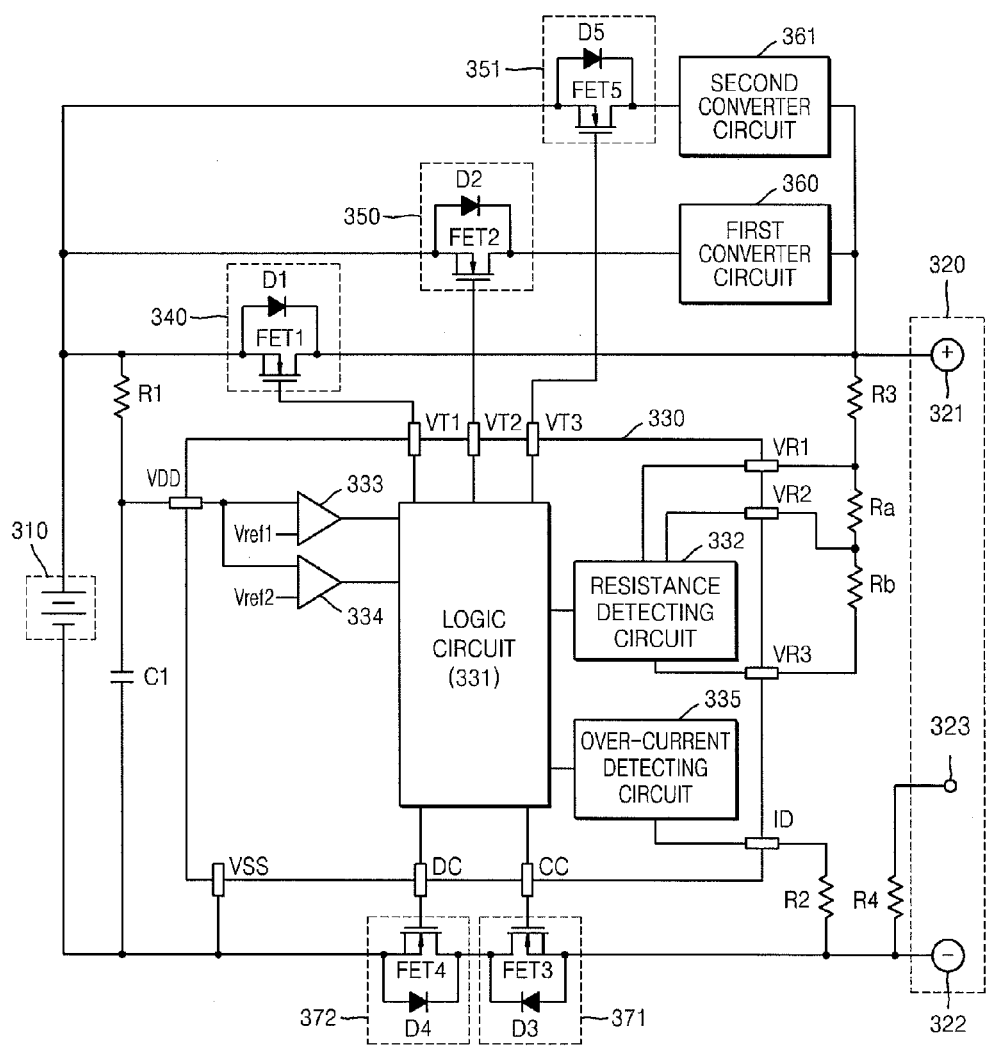
FIG. 5 is a circuit diagram of the battery pack of FIG. 4.

FIG. 4 is a block diagram illustrating a battery pack 300 according to another embodiment. FIG. 5 is a circuit diagram of the battery pack 300 of FIG. 4. The battery pack 300 has structures and functions similar to those of the battery pack 100 illustrated in FIGS. 1 and 2, and thus some differences between the battery pack 300 and the battery pack 100 are described.

The battery pack 300 may further include a second converter circuit 361 and a third switching element 351. In the battery pack 100 of FIG. 1, the first converter circuit 160 increases and decreases the input voltage, but in the present embodiment, a first converter circuit 360 increases the input voltage, and a second converter circuit 361 decreases the input voltage. In addition, the third switching element 351 is connected in series with a current path between a battery cell 310 and the second converter circuit 361 to form a charging path. The third switching element 351 is controlled to be in one of on and off states by a control signal from a protection circuit 330. When the third switching element 351 is in an on-state, an output voltage of the second converter circuit 361 is applied to the battery cell 310 as a charging voltage.

A first switching element 340 includes the FET1 and the D1, a second switching element 350 includes the FET2 and the D2, and the third switching element 351 includes a FET5 and a D5. When the battery cell 310 is charged, one of the first through third switching elements 340, 350 and 351 is in an on-state. Thus, in the present embodiment, all three switches are not controlled using only one control signal, and different control signals generated in a logic circuit 331 are applied to the FET1, the FET2, and the FET5, respectively. Each of the first through third switching elements 340, 350 and 351 form a path for charging. Thus, source electrodes of the FET1, FET2 and FET5 are connected to a positive electrode of the battery cell 310. Accordingly, when the battery cell 310 is charged, a charging current may be prevented from being supplied to the battery cell 310 simultaneously via the first switching element 340, the second switching element 350, and the third switching element 351.

Figure 6:
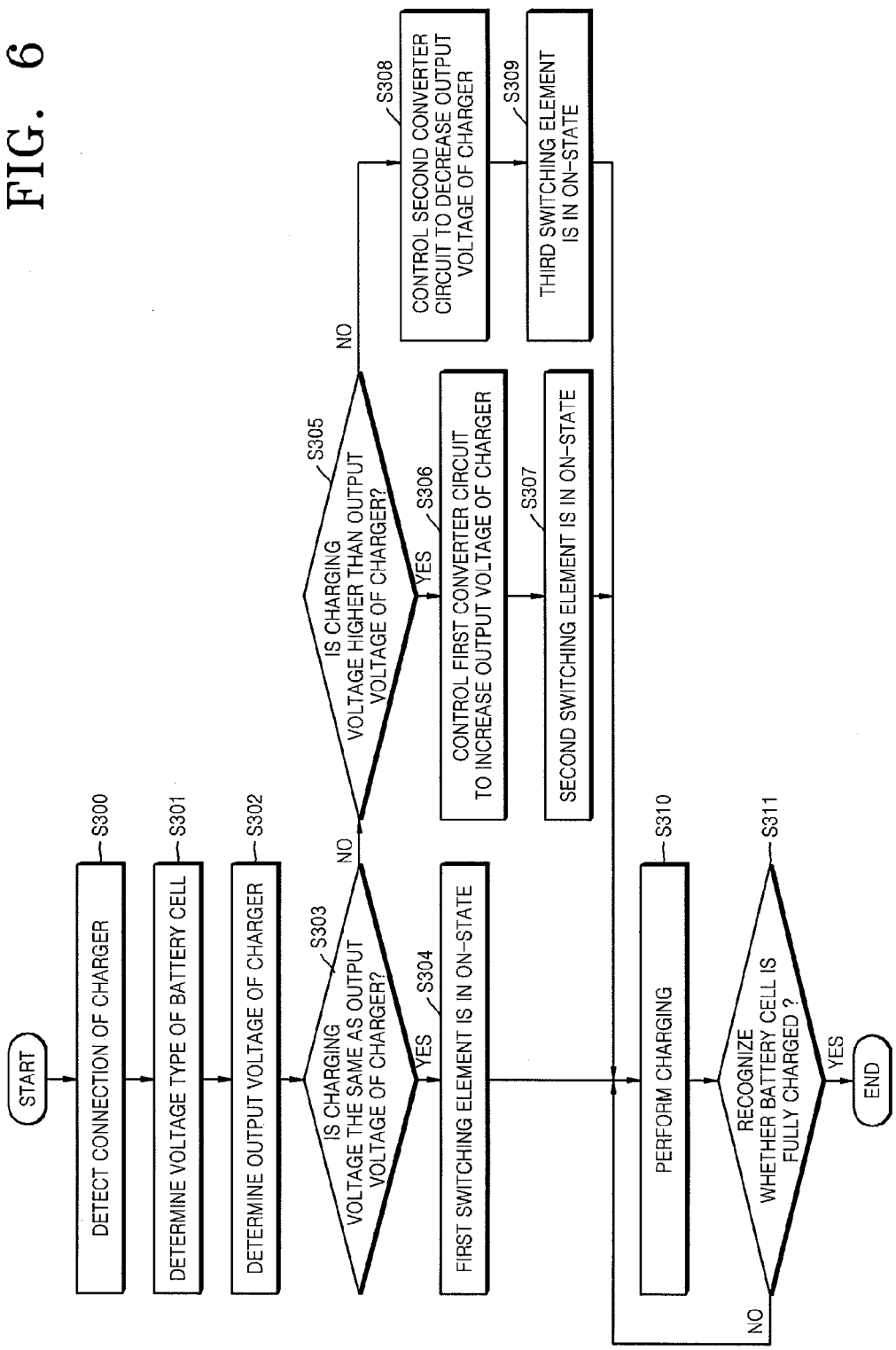
FIG. 6 is a flowchart illustrating a method of charging a battery pack, according to another embodiment.

FIG. 6 is a flowchart illustrating a method of charging a battery pack 300.

The method of charging the battery pack 300 in the present embodiment is similar to the method for the battery pack 100 illustrated in FIG. 3, and thus certain differences therebetween are described.

The battery pack 300 includes a circuit for increasing the output voltage of the charger and a circuit for decreasing the output voltage thereof. Thus, a logic circuit 331 does not need to control the first converter circuit 360 to increase or decrease the output voltage of the charger. Therefore, if the charging voltage is greater than the output voltage of the charger, the first converter circuit 360 increases the output voltage of the charger (operation S306). To allow the increased voltage to be applied to the battery cell 310, the logic circuit 331 applies a low-level control signal to the second switching element 350 to switch on the FET2 (operation S307). Accordingly, a current path through a positive electrode terminal 321, the first converter circuit 360, the FET2, the battery cell 310, the D4, the FET3, and a negative electrode terminal 322 is formed.

On the other hand, if the charging voltage is lower than the output voltage of the charger, the second converter circuit 360 decreases the output voltage of the charger (operation S308). To allow the decreased voltage to be applied to the battery cell 310, the logic circuit 331 applies a low-level control signal to the third switching element 351 to switch on the FET5 (operation S309). Accordingly, a current path through the positive electrode terminal 321, the second converter circuit 361, the FET5, the battery cell 310, the D4, the FET3, and the negative electrode terminal 322 is formed.

A program for executing methods of charging a battery pack according to the one or more of the above embodiments of the present invention may be stored in recording media. The term "recording media" used herein includes computer or processor readable media, and the recording media may be semiconductor recoding media, for example, flash memories. The recording media is readable by a computer, and may be executed in a processor.

It should be understood that the exemplary embodiments described herein should be considered in a descriptive sense. Descriptions of features or aspects within each embodiment should typically be considered as available for use in other embodiments.

What is claimed is:

1. A battery pack comprising:
   a chargeable battery cell;
   a charging terminal part selectively connectable to the battery cell;
   a protection circuit configured to control charging of the battery cell;
   a first switching element connected to the battery cell and to the charging terminal part;
   a converter circuit connected to the charging terminal part, the converter circuit configured to receive an input voltage applied to the charging terminal part and to output a voltage different from the input voltage; and
   a second switching element connected between the converter circuit and the battery cell,
   wherein the protection circuit determines the input voltage and a voltage for charging the battery cell, and
   wherein, if the input voltage is substantially the same as a voltage corresponding to the voltage for charging the battery cell, the protection circuit switches on the first switching element to connect the charging terminal part to the battery cell.

2. The battery pack of claim 1, wherein, if the input voltage is lower than a voltage corresponding to the voltage for charging the battery cell, the protection circuit controls the converter circuit to increase the input voltage.

3. The battery pack of claim 2, wherein if the input voltage is lower than the voltage corresponding to the voltage for charging the battery cell, the protection circuit switches on the second switching element and switches off the first switching element.

4. The battery pack of claim 1, wherein, if the input voltage is higher than a voltage corresponding to the voltage for charging the battery cell, the protection circuit controls the converter circuit to decrease the input voltage.

5. The battery pack of claim 4, wherein if the input voltage is higher than the voltage corresponding to the voltage for charging the battery cell, the protection circuit switches on the second switching element and switches off the first switching element.

6. The battery pack of claim 1, wherein the converter circuit comprises a first converter circuit for outputting a voltage greater than the input voltage and a second converter circuit for outputting a voltage less than the input voltage, wherein the battery pack further comprises a third switching element connected between the second converter circuit and the battery cell, and the second switching element is connected between the first converter circuit and the battery cell.

7. The battery pack of claim 6, wherein, if the input voltage is lower than a voltage corresponding to the voltage for charging the battery cell, the protection circuit switches on the second switching element and switches off the first and third switching elements.

8. The battery pack of claim 6, wherein, if the input voltage is higher than a voltage corresponding to the voltage for charging the battery cell, the protection circuit switches on the third switching element and switches off the first and second switching elements.

9. The battery pack of claim 1, further comprising a plurality of resistors for determining the input voltage and the voltage for charging the battery cell.

10. The battery pack of claim 9, wherein a resistance of at least one of the resistors corresponds to the voltage for charging the battery cell.

11. The battery pack of claim 1, wherein the protection circuit stores information about the voltage for charging the battery cell.

12. A method of charging a battery pack comprising a battery cell and a charging control circuit for controlling charging of the battery cell, the method comprising:
    determining that a charger is connected to the battery pack;
    determining a first voltage applied by the charger;
    determining a voltage for charging the battery cell;
    comparing the first voltage with the charging voltage;
    based on the comparing, charging the battery cell with the first voltage by closing a first switch connected to the battery pack or charging the battery with a second voltage by closing a second switch connected to the battery pack, wherein the second voltage is generated based on the first voltage.

13. The method of claim 12, wherein, if the first voltage is substantially the same as the voltage for charging the battery cell, the battery cell is charged with the first voltage.

14. The method of claim 12, wherein, if the first voltage is lower than a voltage corresponding to the voltage for charging the battery cell, the battery cell is charged with a second voltage generated from the first voltage, wherein the second voltage is greater than the first voltage.

15. The method of claim 12, wherein, if the first voltage is higher than a voltage corresponding to the voltage for charging the battery cell, the battery cell is charged with a third voltage generated from the first voltage, wherein the third voltage is less than the first voltage.

16. The method of claim 12, wherein paths other than a path through which the battery cell is charged are blocked.

17. The method of claim 12, wherein the first voltage and the voltage for charging the battery cell are determined by using one or more resistors connected to a charging control circuit.

18. The method of claim 12, wherein a charging control circuit stores information about the voltage for charging the battery cell.

* * * * *